US010984837B2

(12) United States Patent
Chen

(10) Patent No.: US 10,984,837 B2
(45) Date of Patent: Apr. 20, 2021

(54) DISPLAY, METHOD FOR MONITORING PLAYED CONTENT AND SYSTEM USING THE SAME

(71) Applicant: Wistron Corporation, New Taipei (TW)

(72) Inventor: Chung-Shiuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/285,164

(22) Filed: Feb. 25, 2019

(65) Prior Publication Data

US 2020/0168254 A1     May 28, 2020

(30) Foreign Application Priority Data

Nov. 28, 2018    (TW) ................................ 107142364

(51) Int. Cl.
    *G11B 27/36*      (2006.01)
    *G06K 9/00*      (2006.01)

(52) U.S. Cl.
    CPC .......... *G11B 27/36* (2013.01); *G06K 9/00744* (2013.01); *G06K 9/00758* (2013.01)

(58) Field of Classification Search
    CPC ........................... G11B 27/36; G06K 9/00758
    See application file for complete search history.

(56) References Cited

U.S. PATENT DOCUMENTS

| | | | | |
|---|---|---|---|---|
| 2007/0256102 A1* | 11/2007 | Shiina | ....................... | G06F 3/14 725/46 |
| 2013/0347019 A1* | 12/2013 | Herlein | ............ | H04N 21/41407 725/22 |
| 2018/0276454 A1* | 9/2018 | Han | ...................... | G06K 9/4628 |

OTHER PUBLICATIONS

"Office Action of Taiwan Counterpart Application," dated Nov. 1, 2019, p. 1-p. 10.

* cited by examiner

*Primary Examiner* — Girumsew Wendmagegn
(74) *Attorney, Agent, or Firm* — JCIPRNET

(57) ABSTRACT

The disclosure provides a display, a method for monitoring played content and a system using the same method. The method includes: capturing a played screen of a multimedia content at a specified timing point; using a first feature extracting model to transform the played screen to a played screen feature sequence; determining whether the reference screen feature sequence corresponding to the specified time point matches the played screen feature sequence; if yes, determining the multimedia contents have been correctly played, and vice versa.

14 Claims, 4 Drawing Sheets

DISPLAY, METHOD FOR MONITORING PLAYED CONTENT AND SYSTEM USING THE SAME

CROSS-REFERENCE TO RELATED APPLICATION

This application claims the priority benefit of Taiwan application serial no. 107142364, filed on Nov. 28, 2018. The entirety of the above-mentioned patent application is hereby incorporated by reference herein and made a part of this specification.

BACKGROUND

Field of the Disclosure

The disclosure relates to a display, a method for monitoring played content and a system using the same method, and in particular to a display, a method for monitoring played content and a system using the same method capable of determining whether a specific video has been correctly played.

Description of Related Art

The content management system for digital signage is a set of service systems commonly used to allow advertisers to play advertisements, manage displays or produce advertising programs. In order to increase the content of advertising information, or to enhance the display effect of the advertisement, the screen of a digital signage is often divided into multiple sub-screens, and each sub-screen may play various multimedia, such as videos, pictures, texts and the like. In this way, the advertiser can make combination of advertisements full of variety and content-dependent by playing multiple sub-screens, thereby achieving marketing products to viewers.

However, if there is an association between the played screen or the sub-screen at each time point, synchronization of playing the played screen or sub-screen at each time point is an important issue. If the screens are out of sync, it is likely that the advertisement will not correctly express the original intention, which will affect the effect of the advertisement. In this case, for the content management system of the digital signage, judging whether the content played on each digital signage is synchronized with the original arrangement becomes the main task of the above system when performing the monitoring service.

Conventionally, the played content on each digital signage is transmitted back to the content management system and presented as a list. Thereafter, human judgment may be employed to monitor whether the advertisement content has been correctly played. Specifically, the digital signage will return the screen displayed at a certain time point to the content management system for the content management system to determine whether the screen returned by the digital signage is the same as expected, thereby determining whether the advertising content has been correctly played.

However, in the above method, since each digital signage needs to frequently return the screens displayed at different time points, the transmission of too much screen data may cause the network bandwidth to be excessively consumed. Moreover, the screen data returned by the digital signage also requires a large amount of manpower to review one by one, which not only takes a lot of time, but also makes it difficult for the human eye to accurately confirm whether each screen or sub-screen is played synchronously.

On the other hand, it is necessary to take FPS (Frame per Second) into consideration when extracting screen from played video. In this case, the frames that are extracted each time at the same time point (for example, the same second) are not the same, so the pixel values of the screen cannot be exactly the same, so the pixel comparison cannot be used as the basis for determining synchronization.

SUMMARY

In view of this, the present disclosure provides a display, a method for monitoring played content, and a played content monitoring system, which may be used to solve the above technical problems.

The present disclosure provides a method for monitoring a played content, including: capturing a played screen of a multimedia content by a display at a specified time point; transforming the played screen into a played picture feature sequence by using a first feature extracting model by the display, and transmitting the played screen feature sequence to a play management device; determining, by the play management device, whether a reference screen feature sequence corresponding to the specified time point in the original multimedia content matches the played screen feature sequence; in response to determining that the reference screen feature sequence matches the played screen feature sequence, determining that the multimedia content has been correctly played; and in response to determining that the reference screen feature sequence does not match the played screen feature sequence, determining that the multimedia content has not been correctly played.

The disclosure provides a played content monitoring system, which includes a display and a play management device. The display is configured to: capture a played screen of a multimedia content at a specified time point; transform the played screen into a played screen feature sequence by using a first feature extracting model, and transmit the played screen feature sequence. The play management device is configured to: receive a played screen feature sequence, and determine whether a reference screen feature sequence corresponding to the specified time point in an original multimedia content matches the played screen feature sequence; in response to determining that the reference screen feature sequence matches the played screen feature sequence, determine that the multimedia content has been correctly played; and in response to determining that the reference screen feature sequence does not match the played screen feature sequence, determine that the multimedia content has not been correctly played.

The disclosure provides a display including a display module, a storage circuit and a processor. The storage circuit stores a plurality of modules. The processor is coupled to the display module and the storage circuit, and accesses the module to perform the following steps: the display module captures a played screen of the multimedia content at a specified time point; and transforms the played screen into a played screen feature sequence by using a first feature extracting model, and transmits the played screen feature sequence.

Based on the above, the display of the embodiment of the present disclosure can return the played screen feature sequence captured from the played screen to the play management device, and the play management device can determine whether the display has correctly played the multimedia content synchronously after obtaining the difference between the played screen feature sequence and the reference screen feature sequence, thereby improving the efficiency and accuracy of the display management device in monitoring the display.

In order to make the aforementioned features and advantages of the disclosure more comprehensible, embodiments accompanying figures are described in detail below.

DESCRIPTION OF EMBODIMENTS

Figure 1:
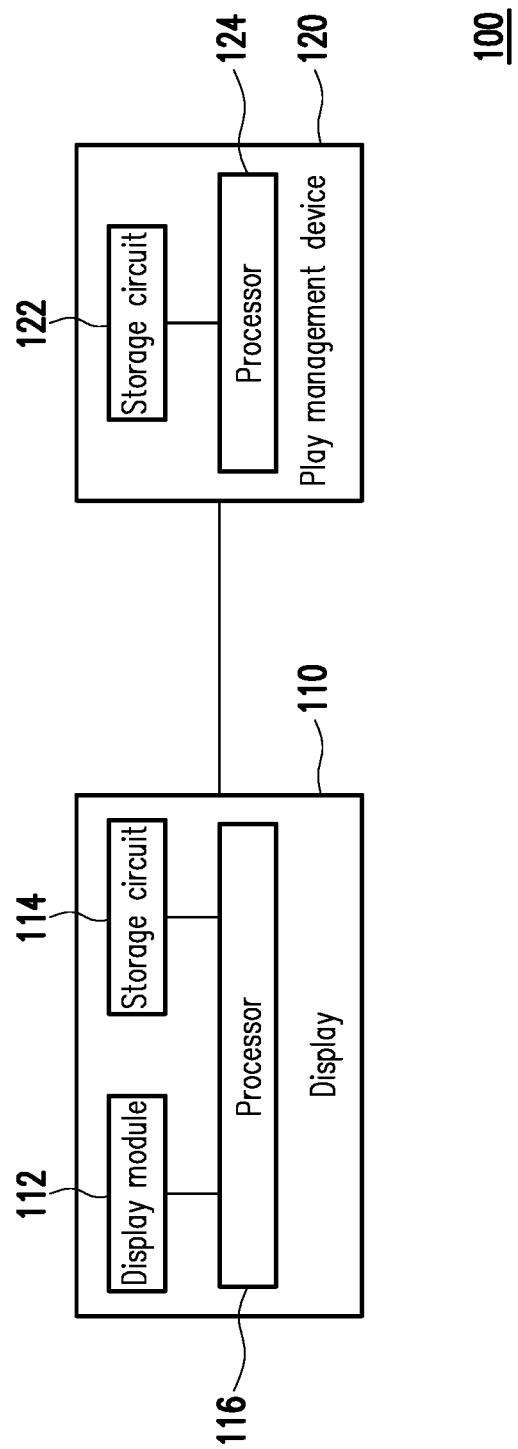
FIG. 1 is a schematic view of a play management system according to an embodiment of the disclosure.

Please refer to FIG. 1, which is a schematic view of a play management system according to an embodiment of the disclosure. In FIG. 1, the play management system 100 includes a display 110 and a play management device 120, wherein the display 110 is, for example, a digital signage or similar display device that may be used to play advertisements or other multimedia content, and the play management device 120 may be used to monitor the condition of playing the advertisement or multimedia content by the display 110. In the embodiment of the present disclosure, when the screen displayed by the display 110 includes a plurality of sub-screens, the play management apparatus 120 may, for example, monitor whether the display 110 has correctly played the sub-screen by determining whether the display 110 has played the sub-screen synchronously. The relevant details will be described below.

As shown in FIG. 1, the display 110 includes a display module 112, a storage circuit 114, and a processor 116. The display module 112 may be used for playing multimedia content including multiple sub-screens, and may be implemented as a liquid crystal display (LCD), a thin film transistor (TFT)-LCD, an organic light-emitting diode (OLED), a flexible display module, a three-dimensional (3D) display module, etc., but not limited thereto. The storage circuit 114 is, for example, a memory, a hard disk, or any other component that can be used to store data, and can be used to record a plurality of program codes or modules. The processor 116 is coupled to the display module 112 and the storage circuit 114, and may be a general-purpose processor, a specific-purpose processor, a conventional processor, a digital signal processor, a plurality of microprocessors, one or more microprocessors combined with digital signal processor core, a controller, a microcontroller, an Application Specific Integrated Circuit (ASIC), a Field Programmable Gate Array (FPGA), any other types of integrated circuits, state machines, Advanced RISC Machine (ARM) based processors, and the like.

The play management device 120 includes the storage circuit 122 and the processor 124 coupled to each other, and the respective possible implementations thereof may be derived from the related descriptions concerning the storage circuit 114 of the display 110 and the processor 116, and details are not described herein.

Figure 2:
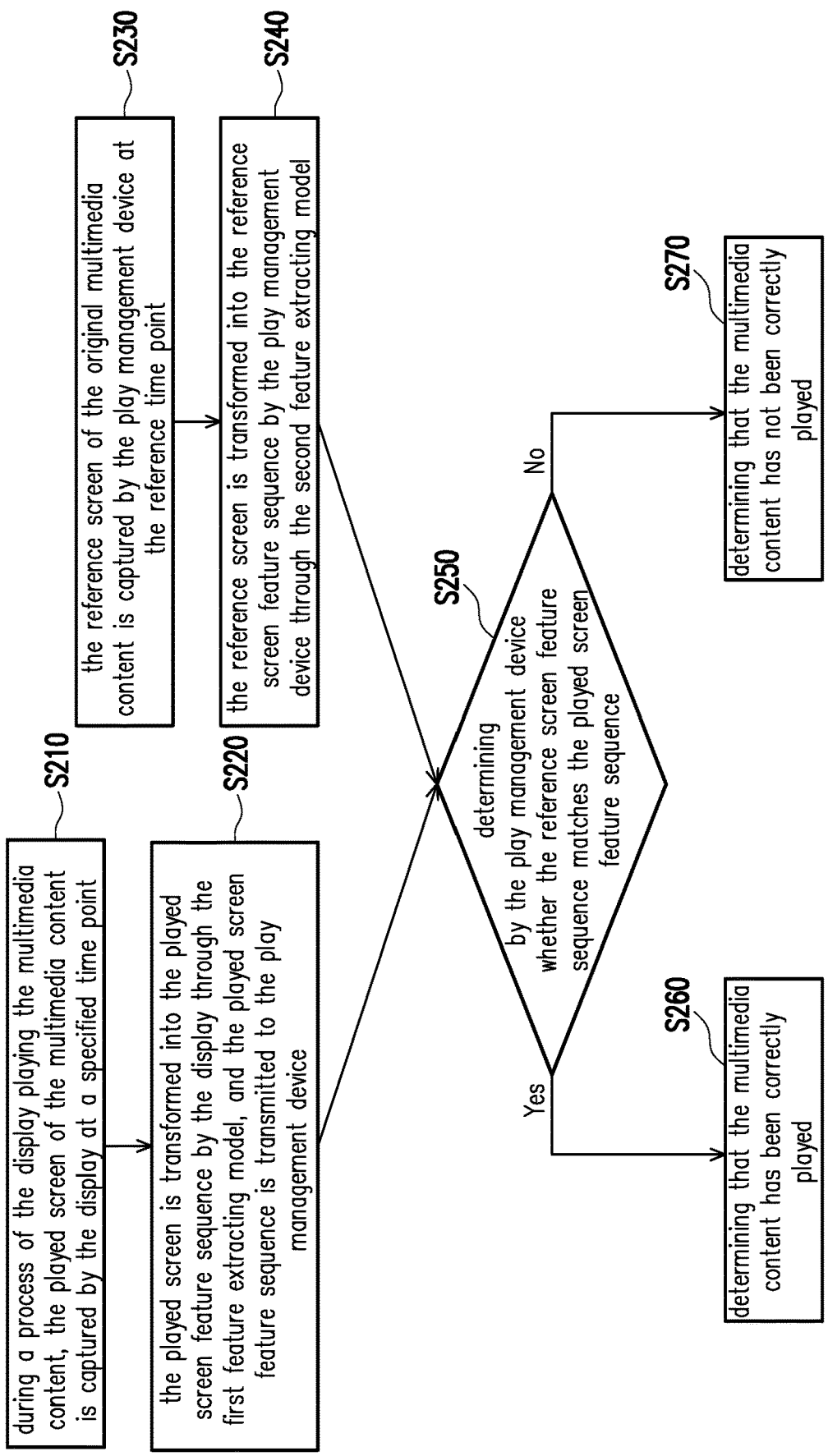
FIG. 2 is a flow chart of a method for monitoring a played content according to an embodiment of the disclosure.
Figure 3:
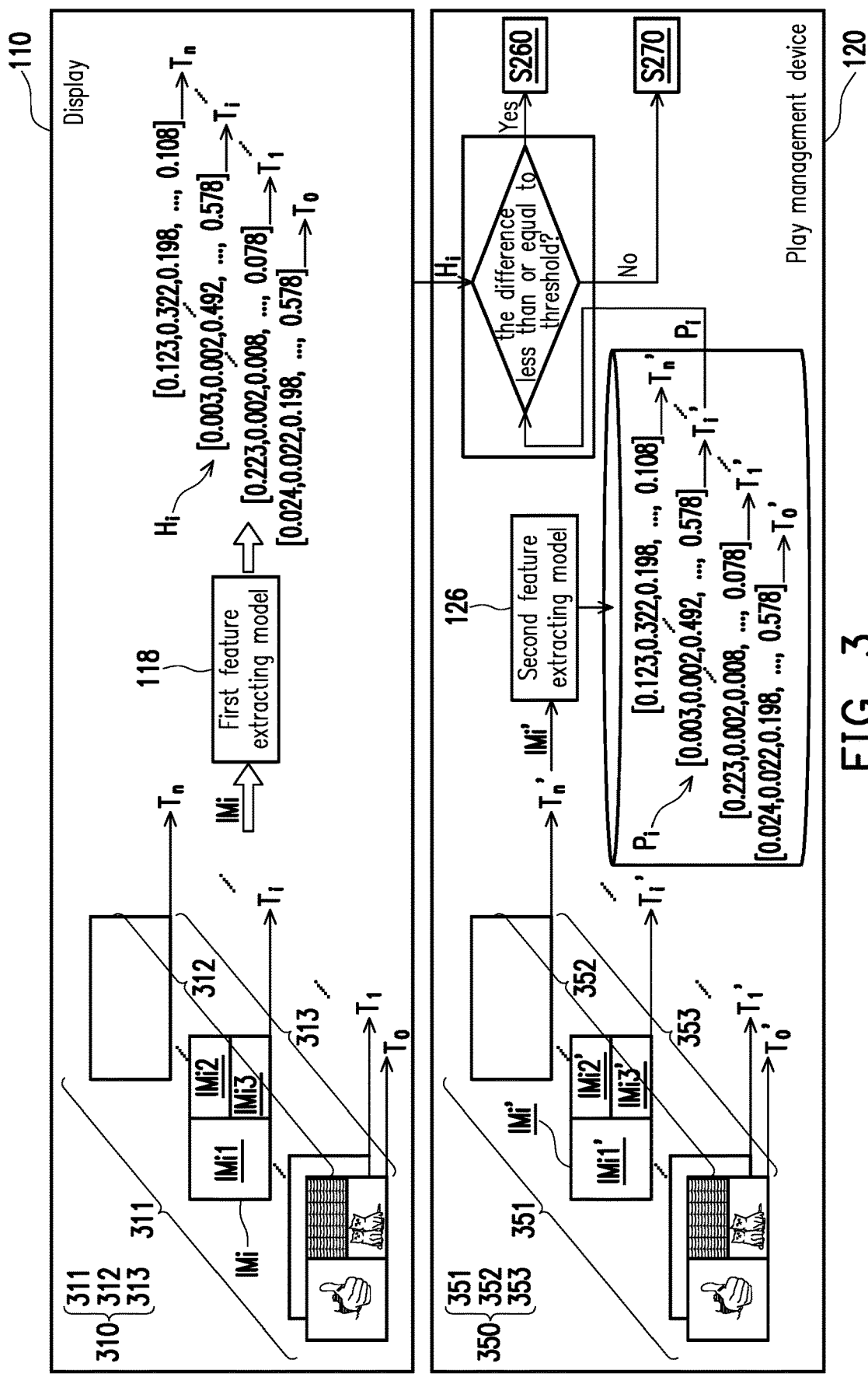
FIG. 3 is a diagram illustrating application according to an embodiment of the disclosure.

Referring to FIG. 2 and FIG. 3, FIG. 2 is a flow chart of a method for monitoring a played content according to an embodiment of the disclosure, and FIG. 3 is a diagram illustrating application scenario according to an embodiment of the disclosure. The method of FIG. 2 may be collaboratively implemented by the display 110 and the play management device 120 in FIG. 1. The details of the steps in FIG. 2 are described below with reference to the contents shown in FIG. 1 and FIG. 3.

First, in step S210, during a process of the display 110 playing the multimedia content 310, the played screen of the multimedia content 310 is captured by the display 110 at a specified time point. As shown in FIG. 3, the multimedia content 310 includes a plurality of multimedia sub-contents 311, 312, and 313, wherein each of the multimedia sub-contents 311-313 is, for example, a separately played video, picture, and text.

In this embodiment, the processor 116 of the display 110 may separately capture the played screen of the multimedia content 310 at a plurality of specified time points $T_0$, $T_1$, $T_i$, . . . , $T_n$ (i is between 0 and n, i is an integer, n is a positive integer), wherein the specified time points $T_0$-$T_n$ may be set to any time point (for example, every second) by the designer based on the needs. For ease of understanding, the description will be made only based on capturing the played screen IMi by the processor 116 at the specified time point $T_i$, and those of ordinary skill in the art should be able to correspondingly derive the operation performed by the processor 116 in capturing the played screen (not shown) at other specified time points.

In FIG. 3, the played screen IMi includes a plurality of sub-played screens IMi1, IMi2, and IMi3 corresponding to the multimedia sub-contents 311 to 313, which are contents displayed respectively by the multimedia sub-contents 311 to 313 at the specified time point Ti.

In step S220, the played screen IMi may be transformed into the played screen feature sequence $H_i$ by the display 110 through the first feature extracting model 118, and the played screen feature sequence $H_i$ is transmitted to the play management device 120. In this embodiment, the processor 116 of the display 110 may input the played screen IMi to the first feature extracting model 118, and the feature sequence captured by the first feature extracting model 118 from the played screen IMi is set as the played screen feature sequence $H_i$.

In an embodiment, the first feature extracting model 118 is, for example, a neural network model, and the processor 116 may input the played screen IMi to this neural network model, and the feature sequence captured by the neural network from the played screen IMi is set as the played screen feature sequence $H_i$. For example, the neural network may be implemented through GoogleNet, which can transform the received played screen IMi into a probability distribution sequence corresponding to 1000 types of objects, and the probability distribution sequence may be used as the played screen feature sequence $H_i$ to be output. In other embodiments, the designer may also implement the first feature extracting model 118 by using SoftNet or other similar models, but not limited thereto.

In step S230, the reference screen of the original multimedia content 350 may be captured by the play management device 120 at the reference time point. In the present embodiment, the original multimedia content 350 includes a plurality of original sub-contents 351, 352, and 353, wherein each of the original sub-contents 351-353 may correspond to the multimedia sub-contents 311-313 one by one. That is, the original sub-content 351 may be identical to the multimedia sub-content 311, the original sub-content 352 may be identical to the multimedia sub-content 312, and the original sub-content 353 may be identical to the multimedia sub-content 313.

In this embodiment, the processor 124 of the play management apparatus 120 may separately capture the screen of the original multimedia content 350 as a reference screen at a plurality of reference time points $T_0', T_1', \ldots, T_i', \ldots, T_n'$, wherein the reference time points $T_0'$ to $T_n'$ may correspond to the specified time points $T_0$ to $T_n$ one by one. In other words, the reference time point $T_i'$ and the specified time point $T_i$ may be the same play time point. For example, if the specified time point $T_i$ is the $10^{th}$ ms after starting playing the multimedia content 310, the reference time point $T_i'$ is the $10^{th}$ ms after starting playing the original multimedia content 350.

To correspond to the teachings in the previous embodiments, the following discussion is only based on the reference screen IMi' captured by the processor 124 at the reference time point $T_i'$ (which corresponds to the specified time point $T_i$). In FIG. 3, the reference screen IMi' includes a plurality of sub-reference screens IMi1', IMi2', IMi3' corresponding to the original sub-contents 351-353, which are respectively the content displayed by the original sub-contents 351-353 at the reference time point $T_i'$.

In step S240, the reference screen IMi' may be transformed into the reference screen feature sequence $P_i$ by the play management device 120 through the second feature extracting model 126. In the present embodiment, the second feature extracting model 126 may be identical to the first feature extracting model 118. For example, the processor 116 and the processor 124 may use the same neural network to establish the first feature extracting model 118 and the second feature extracting model 126.

In an embodiment, if the display 110 is capable of correctly playing the multimedia sub-contents 311 to 313 synchronously, the played screen IMi and the reference screen IMi' captured at the same play time point should be identical to each other. Moreover, since the processor 116 and the processor 124 use the same neural network to establish the first feature extracting model 116 and the second feature extracting model 126, the played screen feature sequence $H_i$ should also be identical to the reference screen feature sequence $P_i$. On the contrary, if the display 110 fails to play the multimedia sub-contents 311-313 synchronously due to a malfunction or other reasons, the played screen IMi will be different from the reference screen IMi'. Correspondingly, the played screen feature sequence $H_i$ will also be different from the reference screen feature sequence $P_i$.

In other words, if the played screen feature sequence $H_i$ is identical to the reference screen feature sequence $P_i$, the play management device 120 can know that the display 110 has correctly played the multimedia sub-contents 311-313 synchronously at the specified time point $T_i$.

Therefore, in step S250, it may be determined by the play management device 120 whether the reference screen feature sequence $P_i$ matches the played screen feature sequence $H_i$. In an embodiment, the processor 124 of the play management apparatus 120 may calculate the difference between the reference screen feature sequence $P_i$ and the played screen feature sequence $H_i$, and determine whether the difference is less than or equal to a threshold. If so, the processor 124 may determine that the reference screen feature sequence $P_i$ matches the played screen feature sequence $H_i$, otherwise it may be determined that the reference screen feature sequence $P_i$ does not match the played screen feature sequence $H_i$. In various embodiments, the threshold may be a value that is close to zero, but not limited thereto.

In an embodiment, the processor 124 may calculate the KL divergence between the reference screen feature sequence $P_i$ and the played screen feature sequence $H_i$ as the difference. The above KL divergence may be expressed as $D_{KL}(H_i|P_i)=\Sigma_j H_j \log_2(H_j/P_j)$. For example, assuming that the played screen feature sequence $H_i$ is [0.1, 0.2, 0.7], and the reference screen feature sequence $P_i$ is [0.1, 0.2, 0.7], then the above KL divergence is $$D_{KL}(H_i \mid P_i) = 0.1 \times \log_2 \frac{0.1}{0.1} + 0.2 \times \log_2 \frac{0.2}{0.2} + 0.7 \times \log_2 \frac{0.7}{0.7} = 0$$

In this case, the processor 124 may determine that the reference screen feature sequence $P_i$ matches the played screen feature sequence $H_i$.

However, assuming that the played screen feature sequence $H_i$ is [0.01, 0.6, 0.39] and the reference screen feature sequence $P_i$ is [0.1, 0.2, 0.7], the above KL divergence is:

$$D_{KL}(H_i \mid P_i) = 0.01 \times \log_2 \frac{0.01}{0.1} + 0.6 \times \log_2 \frac{0.6}{0.2} + 0.39 \times \log_2 \frac{0.39}{0.7} = 0.1772$$

In this case, the processor 124 may determine that the reference screen feature sequence $P_i$ does not match the played screen feature sequence $H_i$.

In other embodiments, the designer may also express the difference between the reference screen feature sequence $P_i$ and the played screen feature sequence $H_i$ in any manner, such as JS divergence, depending on the needs, the disclosure provides no limitation thereto.

Referring to FIG. 2 again, in response to determining that the reference screen feature sequence $P_i$ matches the played screen feature sequence $H_i$, the play management device 120 may determine that the multimedia content 310 has been correctly played in step S260, for example, the multimedia sub-contents 311-313 have been correctly played. On the contrary, in response to determining that the reference screen feature sequence $P_i$ does not match the played screen feature sequence $H_i$, the play management device 120 may determine in step S270 that the multimedia content 310 has not been correctly played, for example, the multimedia sub-contents 311-313 have not been correctly played.

It can be seen from the above that the method for monitoring played content proposed by the present disclosure allows the display to only return the played screen feature sequence transformed from the played screen to the play management device, thereby effectively saving network bandwidth. Moreover, since the play management device only needs to perform simple calculation to obtain the difference between the played screen feature sequence and the reference screen feature sequence, and further determines whether the display has correctly played the multimedia content synchronously, the efficiency and accuracy of the play management device in monitoring the display can be improved.

In other embodiments, the present disclosure further proposes the following mechanism to specifically find out which sub-screen is out of sync, which will be described below with reference to FIG. 4.

Figure 4:
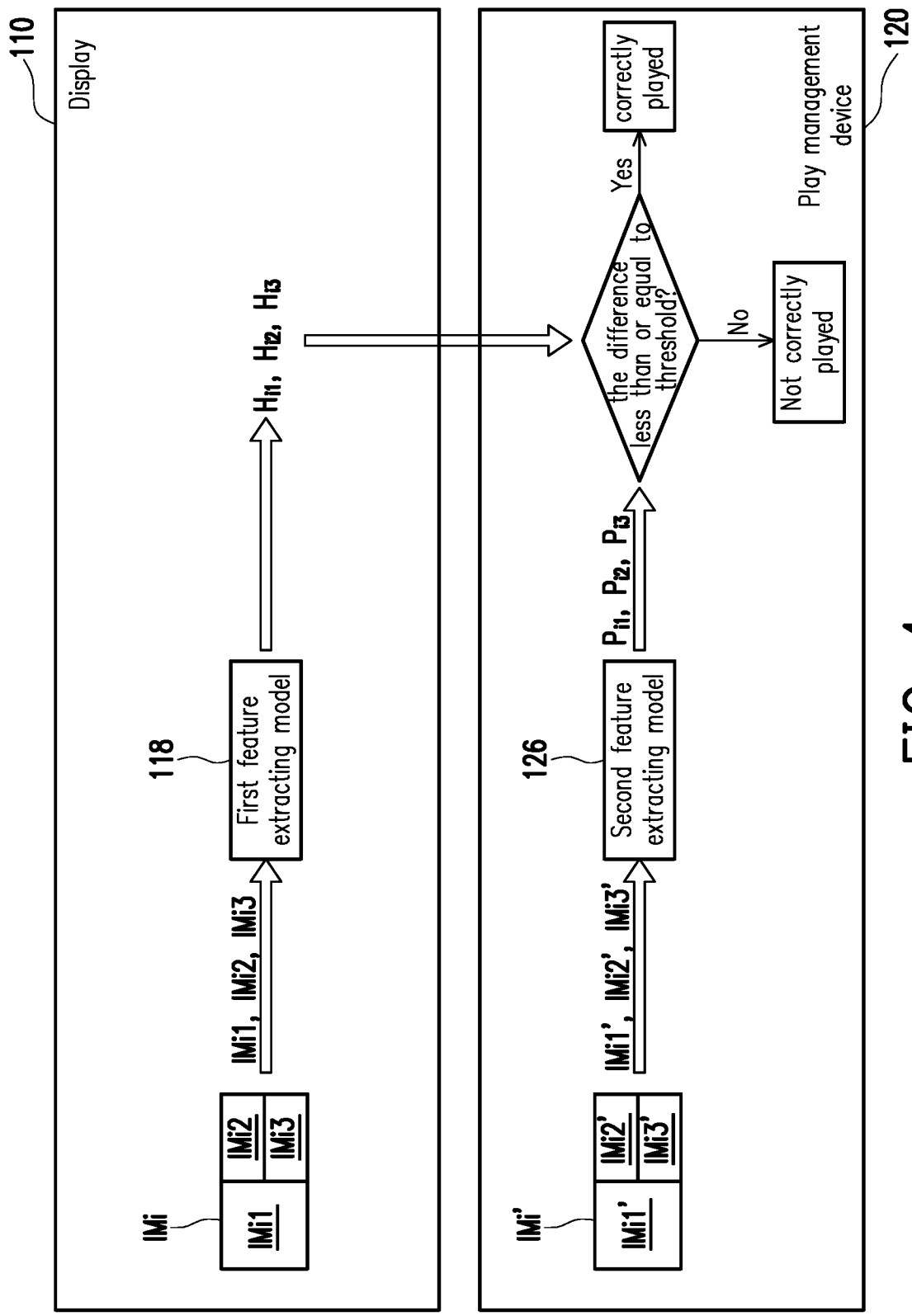
FIG. 4 is a diagram illustrating another application according to FIG. 3.

Please refer to FIG. 4, which is a diagram illustrating another application according to FIG. 3. In this embodiment, the display 110 may transform the sub-played screens IMi1, IMi2, and IMi3 into corresponding sub-played screen feature sequences $H_{i1}$, $H_{i2}$, and $H_{i3}$ by using the first feature extracting model 118, and transmit the sub-played screen feature sequence $H_{i1}$-$H_{i3}$ to the play management device 120.

Correspondingly, the play management device 120 may also transform the sub-reference screens IMi1', IMi2', and IMi3' into corresponding sub-reference screen feature sequences $P_{i1}$, $P_{i2}$, $P_{i3}$ by using the second feature extracting model 126.

In an embodiment, in response to determining that the multimedia sub-contents 311-313 have not been correctly played, the play management device 120 may further calculate the difference between each of the sub-played screen feature sequences $H_{i1}$, $H_{i2}$, and $H_{i3}$ and the corresponding sub-reference screen feature sequences $P_{i1}$, $P_{i2}$, $P_{i3}$ to specifically find out which of the multimedia sub-contents 311 to 313 has not been correctly played. For example, assuming that only the difference between the sub-played screen feature sequence $H_{i1}$ and the sub-reference screen feature sequence $P_{i1}$ is not 0, it represents that the multimedia sub-content 311 corresponding to the sub-played screen feature sequence $H_{i1}$ has not been correctly played. For example, assuming that the difference between the sub-played screen feature sequence $H_{i2}$ and the sub-reference screen feature sequence $P_{i2}$, and the difference between the sub-played screen sequence $H_{i3}$ and the sub-reference screen feature sequence $P_{i3}$ are not 0, it represents that the multimedia sub-contents 312 and 313 corresponding to the sub-played screen feature sequences $H_{i2}$ and $H_{i3}$ have not been correctly played.

In this manner, the relevant personnel (for example, an advertiser) can grasp the display situation of the player 110 more accurately, and take corresponding maintenance or adjustment measures accordingly, such as restarting the display 110, or fast-forwarding the played screen of the display 110.

In summary, the embodiment of the present disclosure allows the display to only return the played screen feature sequence captured from the played screen to the play management device, thereby effectively saving network bandwidth. Moreover, since the play management device only needs to perform simple calculation to obtain the difference between the played screen feature sequence and the reference screen feature sequence, and further determines whether the multimedia content has been correctly played synchronously, in this manner, the efficiency and accuracy of the play management device in monitoring the display can be improved without taking into consideration the FPS.

In addition, the display may further transmit the sub-played screen feature sequence corresponding to each sub-played screen in the played screen to the play management device, so that the play management device can further find which multimedia sub-content has not been correctly played after determining that the display has not correctly displayed the multimedia content.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A method for monitoring played content, comprising:
   capturing a played screen of a multimedia content by a display at a specified time point;
   inputting, by the display, the played screen to a first feature extracting model, and using a first feature sequence captured from the played screen through the first feature extracting model as a played screen feature sequence;
   transmitting the played screen feature sequence to a play management device;
   capturing, by the play management device, a reference screen of an original multimedia content at a reference time point, and the reference time point corresponding to the specified time point; and
   inputting the reference screen by the play management device to a second feature extracting model, and using a second feature sequence captured through the second feature extracting model from the reference screen as the reference screen feature sequence;
   determining, by the play management device, whether the reference screen feature sequence corresponding to the specified time point in the original multimedia content matches the played screen feature sequence;
   in response to determining that the reference screen feature sequence matches the played screen feature sequence, determining that the multimedia content has been correctly played;
   in response to determining that the reference screen feature sequence does not match the played screen feature sequence, determining that the multimedia content has not been correctly played.

2. The method according to claim 1, wherein the first feature extracting model and the second feature extracting model are the same neural network.

3. The method according to claim 1, wherein the step of determining whether the reference screen feature sequence matches the played screen feature sequence comprises:
   calculating a difference between the reference screen feature sequence and the played screen feature sequence, and determining whether the difference is less than or equal to a threshold;
   in response to that the difference is less than or equal to the threshold, determining that the reference screen feature sequence matches the played screen feature sequence;
   in response to that the difference is not less than or equal to the threshold, determining that the reference screen feature sequence does not match the played screen feature sequence.

4. The method according to claim 3, wherein the difference is a KL divergence or a JS divergence between the reference screen feature sequence and the played screen feature sequence.

5. The method according to claim 1, wherein the multimedia content comprises a plurality of multimedia sub-contents, the played screen comprises a plurality of sub-played screens corresponding to the plurality of multimedia sub-contents, wherein the original multimedia content comprises a plurality of original sub-contents corresponding to the plurality of multimedia sub-contents, and the reference screen comprises a plurality of sub-reference screens corresponding to the plurality of original sub-contents.

6. The method according to claim 5, wherein a first multimedia sub-content of the plurality of multimedia sub-contents corresponds to a first original sub-content of the plurality of original sub-contents, the plurality of sub-played screens comprise a first sub-played screen corresponding to the first multimedia sub-content, the plurality of sub-reference screens comprise a first sub-reference screen corresponding to the first original sub-content, and the method further comprising:
    transforming the first sub-played screen into a first sub-played screen feature sequence by the display through the first feature extracting model, and transmitting the first sub-played screen feature sequence to the play management device;
    transforming the first sub-reference screen into a first sub-reference screen feature sequence by the play management device through the second feature extracting model;
    in response to determining that the first sub-played screen feature sequence matches the first sub-reference screen feature sequence, determining that the first multimedia sub-content has been correctly played; and
    in response to determining that the first sub-played screen feature sequence does not match the first sub-reference screen feature sequence, determining that the first multimedia sub-content has not been correctly played.

7. A played content monitoring system, comprising:
    a display, configured to:
        capture a played screen of a multimedia content at a specified time point;
        input, by the display, the played screen to a first feature extracting model, and using a first feature sequence captured from the played screen through the first feature extracting model as a played screen feature sequence;
        transmit the played screen feature sequence; and
    a play management device, configured to:
        capture, by the play management device, a reference screen of an original multimedia content at a reference time point, and the reference time point corresponding to the specified time point; and
        input the reference screen by the play management device to a second feature extracting model, and using a second feature sequence captured through the second feature extracting model from the reference screen as the reference screen feature sequence;
        receive the played screen feature sequence, and determine whether the reference screen feature sequence corresponding to the specified time point in the original multimedia content matches the played screen feature sequence;
        in response to determining that the reference screen feature sequence matches the played screen feature sequence, determine that the multimedia content has been correctly played;
        in response to determining that the reference screen feature sequence does not match the played screen feature sequence, determine that the multimedia content has not been correctly played.

8. The system according to claim 7, wherein the first feature extracting model and the second feature extracting model are the same neural network.

9. The system according to claim 7, wherein the play management device is configured to:
    calculate a difference between the reference screen feature sequence and the played screen feature sequence, and determine whether the difference is less than or equal to a threshold;
    in response to that the difference is less than or equal to the threshold, determine that the reference screen feature sequence matches the played screen feature sequence;
    in response to that the difference is not less than or equal to the threshold, determine that the reference screen feature sequence does not match the played screen feature sequence.

10. The system according to claim 9, wherein the difference is a KL divergence or a JS divergence between the reference screen feature sequence and the played screen feature sequence.

11. The system according to claim 7, wherein the multimedia content comprises a plurality of multimedia sub-contents, the played screen comprises a plurality of sub-played screens corresponding to the plurality of multimedia sub-contents, wherein the original multimedia content comprises a plurality of original sub-contents corresponding to the plurality of multimedia sub-contents, and the reference screen comprises a plurality of sub-reference screens corresponding to the plurality of original sub-contents.

12. The system according to claim 11, wherein a first multimedia sub-content of the plurality of multimedia sub-contents corresponds to a first original sub-content of the plurality of original sub-contents, the plurality of sub-played screens comprise a first sub-played screen corresponding to the first multimedia sub-content, the plurality of sub-reference screens comprise a first sub-reference screen corresponding to the first original sub-content, and the display further transforms the first sub-played screen into a first sub-played screen feature sequence through the first feature extracting model, and transmits the first sub-played screen feature sequence to the play management device, and the play management device is further configured to:
    transform, by the second feature extracting model, the first sub-reference screen into a first sub-reference screen feature sequence;
    in response to determining that the first sub-played screen feature sequence matches the first sub-reference screen feature sequence, determine that the first multimedia sub-content has been correctly played; and
    in response to determining that the first sub-played screen feature sequence does not match the first sub-reference screen feature sequence, determine that the first multimedia sub-content has not been correctly played.

13. A display, comprising:
    a display module;
    a storage circuit, storing a plurality of modules; and
    a processor, coupled to the display module and the storage circuit, and accesses the modules to perform the following steps:
        capturing a played screen of a multimedia content by the display module at a specified time point;
        transforming the played screen into a played screen feature sequence by using a first feature extracting model, and transmitting the played screen feature sequence;
        wherein the multimedia content comprises a plurality of multimedia sub-contents, the played screen comprises a plurality of sub-played screens corresponding to the plurality of multimedia sub-contents, wherein the plurality of multimedia sub-contents comprise a first multimedia sub-content, the plurality of sub-played screens comprise a first sub-played screen corresponding to the first multimedia sub-content, and the processor further transforms the first sub-played screen into a first sub-played screen feature sequence by using the first feature extracting model, and transmits the first sub-played screen feature sequence.

14. The display according to claim 13, wherein the played screen feature sequence and the first sub-played screen feature sequence are transmitted to a play management device for the play management device to determine whether the display has played the multimedia content synchronously.

* * * * *